(12) United States Patent
Mainka et al.

(10) Patent No.: US 6,715,954 B2
(45) Date of Patent: Apr. 6, 2004

(54) INSTRUMENT SUPPORT MEMBER

(75) Inventors: Christoph Mainka, Hamm (DE); Andreas Hitz, Erwitte (DE)

(73) Assignee: Benteler AG, Paderborn (DE)

(*) Notice: Subject to any disclaimer, the term of this patent is extended or adjusted under 35 U.S.C. 154(b) by 37 days.

(21) Appl. No.: 09/815,291

(22) Filed: Mar. 22, 2001

(65) Prior Publication Data

US 2001/0043835 A1 Nov. 22, 2001

(30) Foreign Application Priority Data

Mar. 23, 2000 (DE) ..................... 200 05 471 U

(51) Int. Cl.⁷ ............... B60H 1/26; F16L 13/02
(52) U.S. Cl. ............. 403/270; 138/114; 138/171; 296/208; 454/69
(58) Field of Search ............. 403/270, 34, 204, 403/341, 344; 138/111, 112, 113, 114, 163, 171, 156; 296/203.03, 205, 208; 454/69

(56) References Cited

U.S. PATENT DOCUMENTS

| | | | | | |
|---|---|---|---|---|---|
| 1,930,285 | A | * | 10/1933 | Robinson | 138/143 |
| 4,033,381 | A | * | 7/1977 | Newman et al. | 138/113 |
| 4,590,652 | A | * | 5/1986 | Harwood | 138/113 |
| 5,060,697 | A | * | 10/1991 | Weinheimer | 138/121 |
| 5,497,809 | A | * | 3/1996 | Wolf | 138/113 |
| 5,938,275 | A | * | 8/1999 | Kleinhans et al. | 296/203.03 |
| 5,947,158 | A | * | 9/1999 | Gross et al. | 138/149 |
| 6,296,301 | B1 | * | 10/2001 | Schroeder et al. | 296/193 |
| 6,322,135 | B1 | * | 11/2001 | Okana et al. | 296/203.03 |

* cited by examiner

Primary Examiner—Lynne H. Browne
Assistant Examiner—Kenn Thompson
(74) Attorney, Agent, or Firm—Friedrich Kueffner

(57) ABSTRACT

An instrument support member with an integrated air conducting unit to be mounted between the A-columns of a motor vehicle is composed of at least two metal shells which are connected to each other by plasma jet welding with an effective focus remote from the nozzle, and a plastic tube surrounded by the shells. The plastic tube is mounted at a radial distance from the shells.

2 Claims, 1 Drawing Sheet

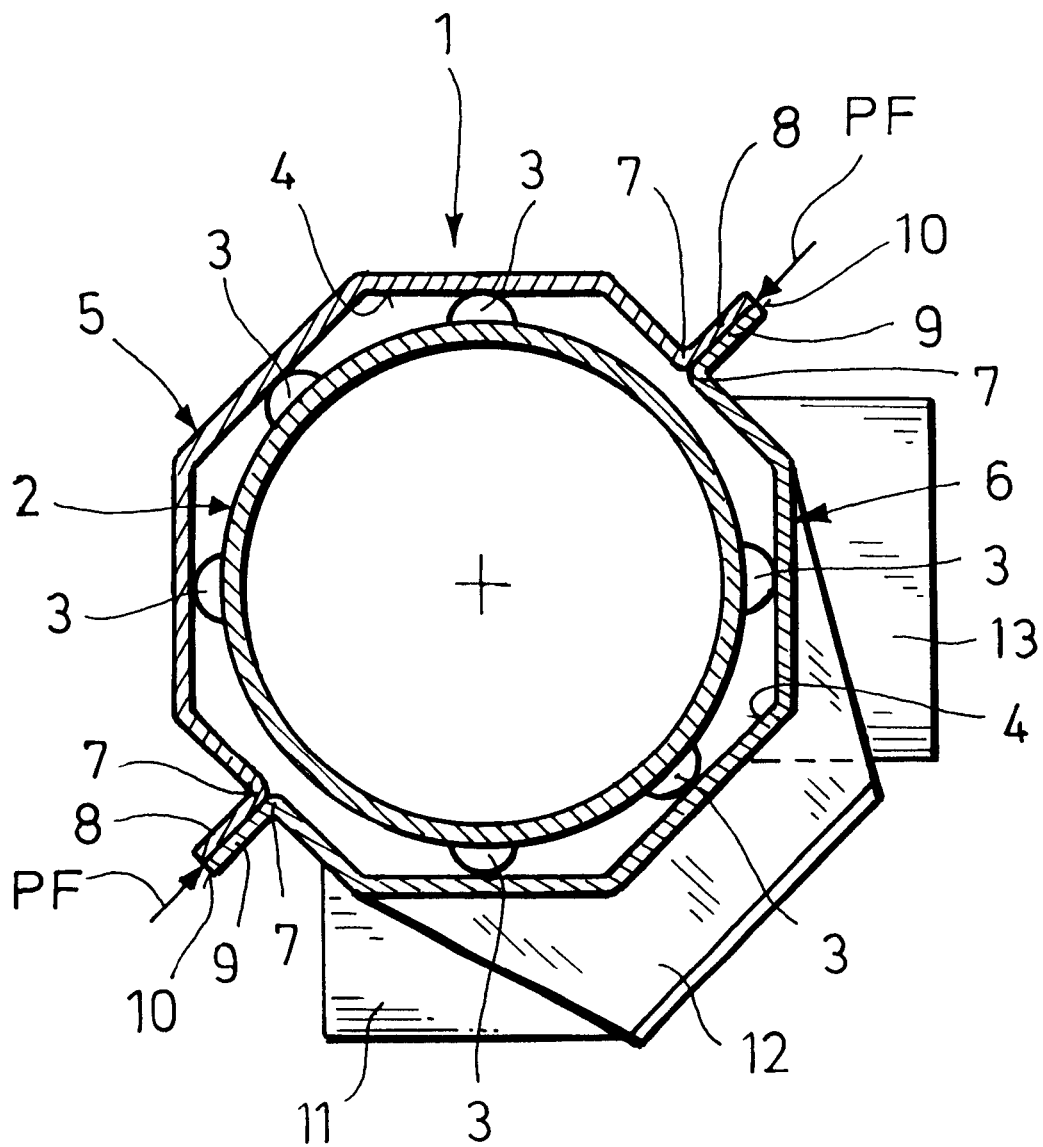

INSTRUMENT SUPPORT MEMBER

BACKGROUND OF THE INVENTION

1. Field of the Invention

The present invention relates to an instrument support member with integrated air conducting means.

2. Description of the Related Art

An instrument support member of this type is integrated between the A-columns of a motor vehicle. The instrument support member serves to support and secure the position, for example, of the steering column, of air bags, etc. Additionally mounted in the instrument support member is an air conducting means in order to be able to ventilate certain areas of the interior of the motor vehicle either with or without air conditioning unit. For this purpose, air outlets are provided at various locations in longitudinal direction of the instrument support member.

An instrument support member which is known in the art has a plastic tube as an air conducting means, wherein the plastic tube is mounted within metal shells. The plastic tube has a small wall thickness. The distance from the plastic tube to the shells is also small. In order to be able to connect the shells by welding instead of using a complicated screw connection, electron beam welding has been used in the past. In accordance with this method, the electron beam is focused on the areas of the shells to be connected, so that the plastic tube is not subjected to disadvantageous temperature applications.

However, the use of the electron beam welding method requires relatively complicated machines. In addition, it is necessary to move the components to be welded together relative to the stationary electron beam. As a result, it was only possible in the past to produce relatively simple welding seams and relatively small curvartures. Consequently, in practice, the configuration of the shells surrounding a plastic tube is limited. It is necessary to make compromises between the optimum air conducting requirements, on the one hand, and the possibilities of integration into the area between two A-columns.

SUMMARY OF THE INVENTION

Therefore, starting from the prior art discussed above, it is the primary object of the present invention to provide an instrument support member with integrated air conducting means which is of simpler construction and which can be better adapted to the air ventilation requirements and to the requirements for mounting in motor vehicles.

In accordance with the present invention, the instrument support member is composed of at least two metal shells which are connected together by plasma jet welding with an effective focus remote from the nozzle, and a plastic tube surrounded by the metal shells, wherein the plastic tube is radially spaced from the shells.

Thus, the core of the invention is the use of plasma jet welding with an effective focus away from the nozzle for connecting the shells. This also provides the particular advantage that the plasma jet can be directed without problems at the areas of the shells to be connected by welding, without disadvantageously affecting the material of the plastic tube.

It is additionally important that it is now possible to guide the plasma jet by means of a robot, so that even compared to the complicated welding curves do not pose any problems. This makes it possible to adjust the shells of the instrument support member in a very targeted manner to the respective mounting conditions in the motor vehicle while maintaining an optimum air conducting means.

The radial distance of the plastic tube from the shells can be achieved in different ways. In accordance with a preferred feature, the plastic tube rests with integrally formed cams against the inner walls of the shells. The cams may be formed from the material of the plastic tube or they may be formed onto the plastic tube. The cams are especially advantageous where the shells, for stiffness reasons among others, have a polygonal profile and a reduced wall thickness.

In accordance with another feature of the present invention, the shells are connected through radially projecting flanges which rest against each other, wherein the end faces of the flanges are connected by plasma jet welding with an effective focus remote from the nozzle. This not only makes the welding process simpler, but also ensures that the plastic tube cannot be damaged. The reason for this is that the end faces of the flanges can be positioned sufficiently far away from the plastic tube.

In accordance with another feature, the shells are provided with welded-on or stamped attachment parts. Thus, because of the use of the plasma jet welding method, it is now possible to provide the shells with welded-on or stamped attachments where this may be useful to meet the requirements of the instrument support member and to obtain an optimum air conducting means. The location of the welding seam is of less significance.

The invention also makes it possible that the shells can be made of aluminum or an aluminum alloy.

However, it is also conceivable that the shells are of sheet steel.

Independent of the material used, the plasma jet welding method makes it possible to provide an instrument support member which has a high load-bearing capacity and still a light weight with respect to the wall thicknesses of the shells as well as of the plastic tube.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

BRIEF DESCRIPTION OF THE DRAWING

In the drawing:

The single FIGURE of the drawing is a vertical sectional view of an instrument support member according to the present invention.

DESCRIPTION OF THE PREFERRED EMBODIMENTS

The drawing shows a vertical sectional view of an instrument support member 1. The instrument support member 1 is integrated between the A-columns of a motor vehicle in a manner which is not illustrated.

The instrument support member is composed of a thin-walled plastic tube 2 which rests through externally arranged cams 3 against the inner walls 4 of two polygonal, also thin-walled shells 5, 6. The shells 5, 6, are of an aluminum alloy and have at their edges 7 radially projecting flanges 8, 9 whose surfaces rest against each other. The end faces 10 of the flanges 8, 9 are connected by plasma jet welding with an effective focus remote from the nozzle; this is schematically illustrated by arrows PF.

The drawing further shows that the shells 5, 6 are provided with various bracket-type attachments 11, 12, 13 for supporting, for example, air bags and a steering column.

In the illustrated embodiment, the attachment parts 11, 12, 13 are stamped from the shell 6.

While specific embodiments of the invention have been shown and described in detail to illustrate the inventive principles, it will be understood that the invention may be embodied otherwise without departing from such principles.

We claim:

1. An instrument support member adapted to be integrated between A-columns of a motor vehicle, the instrument support member comprising an air-conducting plastic tube of a plastic material having integrally formed-on cams of the plastic material on an outer surface thereof, and two shells of sheet steel surrounding the plastic tubes such that the cams are in contact with an inner surface of the shells, the shells comprising radially projecting flanges resting against one another and connected by plasma jet welding using a nozzle with an effective focus remote from the nozzle, the shells further comprising welded-on or stamped attachment parts adapted for supporting motor vehicle components.

2. A method of manufacturing an instrument support member adapted to be mounted between A-columns of a motor vehicle, the method comprising embedding an air-conducting plastic tube of a plastic material provided with integrally formed-on cams of the plastic material at an outer surface thereof, and two shells of sheet steel provided with radially projecting flanges connected to one another and with welded-on or stamped attachment parts such that the cams are in contact with inner surfaces of the shells, and welding the flanges of the shells together at end faces thereof by plasma jet welding using a nozzle with an effective focus remote from the nozzle.

\* \* \* \* \*